(12) United States Patent
Tajiri et al.

(10) Patent No.: US 11,427,674 B2
(45) Date of Patent: Aug. 30, 2022

(54) DISPERSANT FOR CALCIUM CARBONATE, CALCIUM CARBONATE COMPOSITION, THERMOPLASTIC RESIN COMPOSITION AND MOLDED BODY

(71) Applicant: DIC Corporation, Tokyo (JP)

(72) Inventors: Yusuke Tajiri, Ichihara (JP); Osamu Suzuki, Ichihara (JP)

(73) Assignee: DIC Corporation, Tokyo (JP)

( * ) Notice: Subject to any disclaimer, the term of this patent is extended or adjusted under 35 U.S.C. 154(b) by 545 days.

(21) Appl. No.: 16/470,801

(22) PCT Filed: Dec. 5, 2017

(86) PCT No.: PCT/JP2017/043596
§ 371 (c)(1),
(2) Date: Jun. 18, 2019

(87) PCT Pub. No.: WO2018/116812
PCT Pub. Date: Jun. 28, 2018

(65) Prior Publication Data
US 2019/0382527 A1 Dec. 19, 2019

(30) Foreign Application Priority Data

Dec. 22, 2016 (JP) .............. JP2016-248891

(51) Int. Cl.
| | |
|---|---|
| *C08G 63/181* | (2006.01) |
| *C08G 63/183* | (2006.01) |
| *C08G 63/06* | (2006.01) |
| *C08J 5/00* | (2006.01) |
| *C08K 3/26* | (2006.01) |
| *C08L 23/06* | (2006.01) |
| *C08L 57/00* | (2006.01) |

(52) U.S. Cl.
CPC .......... *C08G 63/183* (2013.01); *C08G 63/06* (2013.01); *C08J 5/00* (2013.01); *C08K 3/26* (2013.01); *C08L 23/06* (2013.01); *C08L 57/00* (2013.01); *C08K 2003/265* (2013.01); *C08L 2205/00* (2013.01)

(58) Field of Classification Search
CPC ...... C08G 63/183; C08G 63/06; C08G 63/20; C08G 63/50; C08L 23/06; C08L 57/00; C08L 2205/00; C08L 67/02; C08L 67/04
See application file for complete search history.

(56) References Cited

U.S. PATENT DOCUMENTS

2002/0037379 A1 * 3/2002 Tai .................. B32B 27/306
428/36.6
2014/0167091 A1   6/2014 Ogasawara et al.

FOREIGN PATENT DOCUMENTS

| JP | 2004-099665 A |   | 4/2004 |  |
|---|---|---|---|---|
| JP | 2004099665 A | * | 9/2004 | ............ A61F 13/49 |
| JP | 2009-149808 A |   | 7/2009 |  |
| JP | 2010-150440 A |   | 7/2010 |  |
| WO | 2013/018360 A1 |   | 2/2013 |  |

OTHER PUBLICATIONS

International Search Report dated Feb. 6, 2018, issued for PCT/JP2017/043596.

* cited by examiner

*Primary Examiner* — Robert S Jones, Jr.
(74) *Attorney, Agent, or Firm* — Locke Lord LLP; James E. Armstrong, IV; Nicholas J. DiCeglie, Jr.

(57) ABSTRACT

Provided are: a dispersant for calcium carbonate that is capable of dispersing calcium carbonate well in a thermoplastic resin; a calcium carbonate composition and a thermoplastic resin composition that each contain the dispersant for calcium carbonate; and a molded body produced by using the thermoplastic resin composition. Specifically, provided are a dispersant for calcium carbonate, including a polyester resin containing an aromatic dicarboxylic acid residue, an aliphatic diol residue, and a monoalcohol residue or a monocarboxylic acid residue and having a melting point of 100 to 250° C.; a calcium carbonate composition that contains the dispersant and calcium carbonate; a thermoplastic resin composition that contains the dispersant, calcium carbonate, and a thermoplastic resin; and a molded body that contains the thermoplastic resin composition.

12 Claims, No Drawings

DISPERSANT FOR CALCIUM CARBONATE, CALCIUM CARBONATE COMPOSITION, THERMOPLASTIC RESIN COMPOSITION AND MOLDED BODY

TECHNICAL FIELD

The present invention relates to a dispersant for calcium carbonate that is capable of dispersing calcium carbonate well in a thermoplastic resin. The present invention also relates to a calcium carbonate composition and a thermoplastic resin composition that each contain the dispersant for calcium carbonate, and a molded body produced by using the thermoplastic resin composition.

BACKGROUND ART

Molded bodies of a variety of thermoplastic resins mixed with inorganic fillers are used in various industries. Specifically, for example, opacified or whitened films or sheets containing a polyolefin resin or a polyethylene terephthalate resin (hereinafter abbreviated as PET resin) and calcium carbonate or barium sulfate are used in, for example, a reflector for a liquid crystal display (hereinafter abbreviated as LCD).

In addition, porous films obtained by subjecting a film in which calcium carbonate is incorporated in a polyolefin resin to a uniaxial or biaxial stretch to generate open voids in the film are used in a wide variety of applications, such as hygiene materials, medical materials, construction materials, agriculture sheets, and battery separators.

In recent years, calcium carbonate has been often used as an inorganic filler that is inexpensive and is also excellent in imparting functions, such as mechanical strength, heat resistance, and oil resistance, to resins. In the use in a reflector for LCD, among various forms of calcium carbonate, calcium carbonate in the form of finer particles has been used for improving functions, such as shielding ability, light reflection, and light scattering.

Calcium carbonate, which has hydrophilic surface and thus easily absorbs moisture and has poor affinity to various resins, often undergoes dispersion failure when mixed with a resin, such as a polyolefin resin or a PET resin. In order to prevent such dispersion failure, a dispersant is generally used when a resin is mixed with calcium carbonate. As a dispersant, for example, a polyester resin obtained by a reaction of trimethylol propane with adipic acid and stearic acid is known (see, for example, PTL 1). However, even with the dispersant disclosed in PTL 1, dispersion of calcium carbonate in resins is not sufficient.

When a resin composition in which calcium carbonate is poorly dispersed in a resin is used to produce, for example, a film to be used in a reflector for LCD, the functions required for the application, such as shielding ability, light reflection, and light scattering, are not fully available, and poor appearance also occurs. In addition, in production of a porous film, open voids formed due to calcium carbonate are not uniformly generated in the film, and thus it is difficult to produce a porous film having uniform properties.

CITATION LIST

Patent Literature

PTL 1: JP-A-2004-099665

SUMMARY OF INVENTION

Technical Problem

An object of the present invention is to provide a dispersant for calcium carbonate that is capable of dispersing calcium carbonate well in a thermoplastic resin. Another object of the present invention is to provide a calcium carbonate composition and a thermoplastic resin composition that each contain the dispersant for calcium carbonate. Still another object of the present invention is to provide a molded body produced by using the thermoplastic resin composition.

Solution to Problem

As a result of intensive and extensive studies, the present inventors have found: that a linear polyester resin that has an aromatic dicarboxylic acid residue and an aliphatic diol residue in the main chain and has capped ends and that has a melting point in the range of 100 to 250° C. can function as a dispersant in dispersion of calcium carbonate in a thermoplastic resin; that the polyester resin can improve dispersion of calcium carbonate even when used in an extremely small amount, i.e., 0.05 to 5 parts by mass based on 100 parts by mass of calcium carbonate; and that a molded body, such as a film, in which calcium carbonate is dispersed well can be produced by using the polyester resin, thus completing the present invention.

Specifically, the present invention provides a dispersant for calcium carbonate that includes a polyester resin containing an aromatic dicarboxylic acid residue, an aliphatic diol residue, and a monoalcohol residue or a monocarboxylic acid residue and having a melting point of 100 to 250° C.

In addition, the present invention provides a calcium carbonate composition including calcium carbonate (A) and a dispersant for calcium carbonate (B) that includes a polyester resin containing an aromatic dicarboxylic acid residue, an aliphatic diol residue, and a monoalcohol residue or a monocarboxylic acid residue and having a melting point of 100 to 250° C., the dispersant for calcium carbonate (B) being contained in an amount of 0.05 to 5 parts by mass based on 100 parts by mass of the calcium carbonate (A).

The present invention also provides a thermoplastic resin composition including calcium carbonate (A), a dispersant for calcium carbonate (B) that includes a polyester resin containing an aromatic dicarboxylic acid residue, an aliphatic diol residue, and a monoalcohol residue or a monocarboxylic acid residue and having a melting point of 100 to 250° C., and a thermoplastic resin (C), the dispersant for calcium carbonate (B) being contained in an amount of 0.05 to 5 parts by mass based on 100 parts by mass of the calcium carbonate (A).

The present invention further provides a molded body that includes the thermoplastic resin composition.

Advantageous Effects of Invention

According to the present invention, it is possible to provide a dispersant for calcium carbonate that is capable of dispersing calcium carbonate well in a thermoplastic resin. With the dispersant, a molded body in which calcium carbonate is dispersed well can be produced. With the dispersant, among molded bodies, a film that can be suitably used in a reflector for LCD and a porous film that can be suitably used as a hygiene material, a medical material, a clothing material, or the like can be produced.

DESCRIPTION OF EMBODIMENTS

The dispersant for calcium carbonate of the present invention includes a polyester resin that contains an aromatic dicarboxylic acid residue, an aliphatic diol residue, and a monoalcohol residue or a monocarboxylic acid residue and that has a melting point of 100 to 250° C.

With a melting point lower than 100° C., the polyester resin melts to cause bridging on a hopper of an extruder in production of the thermoplastic resin composition of the present invention, resulting in poor availability of functions as a dispersant for calcium carbonate, which is not preferred. In addition, with a melting point higher than 250° C., the polyester resin is not sufficiently melt-mixed when mixed with calcium carbonate and the thermoplastic resin in production of the thermoplastic resin composition of the present invention, resulting in poor availability of functions as a dispersant for calcium carbonate, which is not preferred. The melting point is preferably 100 to 240° C., and more preferably 130 to 240° C.

In the present invention, the melting point (Tm) was measured according to the following differential scanning calorimetry (DSC). Using differential scanning calorimeter DSC822e (from METTLER TOLEDO), 5 mg of a polyester resin was put in a light-weight aluminum pan and was heated under nitrogen atmosphere from 25° C. to 250° C. at 10° C./min (1st run), and then was cooled quickly once to 0° C., and again heated form 0° C. to 250° C. at 10° C./min (2nd run). The melting point (Tm) was determined from the DSC curve obtained in the 2nd run.

Examples of the aromatic dicarboxylic acid residues include a phthalic acid residue, a terephthalic acid residue, an isophthalic acid residue, a 2,6-naphthalenedicarboxylic acid residue, a 1,5-naphthalenedicarboxylic acid residue, and a 1,4-naphthalenedicarboxylic acid residue.

The aromatic dicarboxylic acid residue is preferably a terephthalic acid residue, an isophthalic acid residue, or a 2,6-naphthalenedicarboxylic acid residue since such a polyester resin has crystallinity and provides a dispersant for calcium carbonate excellent in handleability in mold-processing of the thermoplastic resin composition of the present invention.

In the present invention, a "dicarboxylic acid residue" refers to an organic group remaining after a carboxyl group is removed from a dicarboxylic acid.

Examples of the aliphatic diol residues include an ethylene glycol residue, a 1,2-propylene glycol residue, a 1,3-propylene glycol residue, a 1,2-butanediol residue, a 1,3-butanediol residue, a 2-methyl-1,3-propanediol residue, a 1,4-butanediol residue, a 1,5-pentanediol residue, a 2,2-dimethyl-1,3-propanediol (neopentyl glycol) residue, a 2,2-diethyl-1,3-propanediol (3,3-dimethylolpentane) residue, a 2-n-butyl-2-ethyl-1,3-propanediol (3,3-dimethylolheptane) residue, a 3-methyl-1,5-pentanediol residue, a 1,6-hexanediol residue, a 2,2,4-trimethyl-1,3-pentanediol residue, a 2-ethyl-1,3-hexanediol residue, a 2-methyl-1,8-octanediol residue, a 1,9-nonanediol residue, a 1,10-decanediol residue, a 1,12-dodecanediol residue, a 2,2-bis(4-hydroxycyclohexyl) propane residue, and an ether glycol residue, such as a diethylene glycol residue or a dipropylene glycol residue.

The aliphatic diol residue is preferably an aliphatic diol residue having 2 to 10 carbon atoms and more preferably an ethylene glycol residue, a 1,3-propylene glycol residue, a 1,4-butanediol residue, or a 1,6-hexanediol residue since such a polyester resin has crystallinity and provides a dispersant for calcium carbonate excellent in handleability in mold-processing of the thermoplastic resin composition of the present invention and the melting point is easily adjusted within 100 to 250° C.

In the present invention, a "glycol residue" refers to an organic group remaining after a hydroxy group is removed from a glycol.

Examples of the monoalcohol residues include aromatic monoalcohol residues and aliphatic monoalcohol residues. Examples of the aromatic monoalcohol residues include a phenol residue, an ethylphenol residue, an isobutylphenol residue, a pentylphenol residue, an octylphenol residue, a dodecylphenol residue, a tetradecylphenol residue, a benzyl alcohol residue, a 2-phenylethanol residue, a 2-phenoxyethanol residue, and a 3-phenyl-1-propanol residue.

Examples of the aliphatic monoalcohol residues include a methanol residue, an ethanol residue, a propanol residue, an isopropanol residue, a butanol residue, a heptanol residue, a hexanol residue, a cyclohexanol residue, an isohexanol residue, an octanol residue, an isooctanol residue, a 2-ethylhexanol residue, a nonanol residue, an isononanol residue, a decanol residue, an isodecanol residue, an undecanol residue, a dodecanol residue, a stearyl alcohol residue, and an oleyl alcohol residue.

Since a dispersant for calcium carbonate having good compatibility to the thermoplastic resin (C) described later, particularly to polyolefin resins can be provided, the monoalcohol residue is preferably an aliphatic monoalcohol residue, more preferably an aliphatic monoalcohol residue having 4 to 22 carbon atoms, and further preferably an octanol residue, a 2-ethylhexanol residue, a nonanol residue, an isononanol residue, a decanol residue, or an undecanol residue.

In the present invention, a "monoalcohol residue" refers to an organic group remaining after a hydroxy group is removed from a monoalcohol.

Examples of the monocarboxylic acid residues include aromatic monocarboxylic acid residues and aliphatic monocarboxylic acid residues. Examples of the aromatic monocarboxylic acid residues include an benzoic acid residue, a dimethylbenzoic acid residue, a trimethylbenzoic acid residue, a tetramethylbenzoic acid residue, an ethylbenzoic acid residue, a propylbenzoic acid residue, a butylbenzoic acid residue, a cuminic acid residue, a p-t-butylbenzoic acid residue, an o-toluic acid residue, a m-toluic acid residue, a p-toluic acid residue, an ethoxybenzoic acid residue, a propoxybenzoic acid residue, a naphthoic acid residue, and an anisic acid residue.

Examples of the aliphatic monocarboxylic acid residues include an acetic acid residue, a propionic acid residue, a butanoic acid residue, a hexanoic acid residue, a cyclohexanecarboxylic acid residue, a 2-ethylhexanoic acid residue, a myristic acid residue, a palmitic acid residue, a stearic acid residue, and a behenic acid residue.

Since a dispersant for calcium carbonate having good compatibility to the thermoplastic resin (C) described later, particularly to polyolefin resins can be provided, the monocarboxylic acid residue is preferably an aliphatic monocarboxylic acid residue and more preferably an aliphatic monocarboxylic acid residue having 1 to 17 carbon atoms.

In the present invention, a "monocarboxylic acid residue" refers to an organic group remaining after a carboxyl group is removed from a monocarboxylic acid.

The polyester resin as the dispersant for calcium carbonate of the present invention has a number average molecular weight (Mn) of preferably 500 to 5,000 and more preferably 800 to 4,000 since such a polyester resin provides a dispersant for calcium carbonate that is capable of dispersing the calcium carbonate (A) well in the thermoplastic resin (C) described later. In addition, the weight average molecular weight is preferably 600 to 15,000, and more preferably 1,000 to 10,000.

Here, in the present invention, the number average molecular weight (Mn) and the weight average molecular weight (Mw) are values converted in terms of polystyrene based on GPC measurements. Note that the conditions of the GPC measurements are as follows.

[GPC Measurement Conditions]
Measurement apparatus: "HLC-8220 GPC" from Tosoh Corporation
Column: guard column "HHR-H" (6.0 mm I.D.×4 cm) from Tosoh Corporation+"TSK-GEL Super HM-H" (6.0 mm I.D.×15 cm) from Tosoh Corporation×2+"TSK-GEL Super H2500" (6.0 mm I.D.×15 cm) from Tosoh Corporation
Detector: ELSD ("ELSD2000" from Ortech)
Data processing: "GPC-8020 model II data analysis version 4.30" from Tosoh Corporation
Measurement Conditions:
Column temperature: 40° C.
Eluent: chloroform
Flow rate: 0.6 ml/min
Sample: 10 mg of polyester resin dissolved in 5 ml of a 1:1 mixed solvent of hexafluoroisopropanol (HFIP) and chloroform (ratio by volume) and then filtered with a micro filter (40 µl)
Standard sample: the following monodispersed polystyrenes with known molecular weights were used in accordance with the measurement manual of the "GPC-8020 model II data analysis version 4.30"
(Monodispersed Polystyrenes)
"A-500" from Tosoh Corporation
"A-1000" from Tosoh Corporation
"A-2500" from Tosoh Corporation
"A-5000" from Tosoh Corporation
"F-1" from Tosoh Corporation
"F-2" from Tosoh Corporation
"F-4" from Tosoh Corporation
"F-10" from Tosoh Corporation
"F-20" from Tosoh Corporation
"F-40" from Tosoh Corporation
"F-80" from Tosoh Corporation
"F-128" from Tosoh Corporation
"F-288" from Tosoh Corporation
"F-550" from Tosoh Corporation Specifically, the dispersant for calcium carbonate of the present invention is a polyester resin having a structure represented by the following general formula (1) or (2):

[Chem. 1]

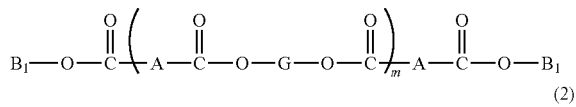

(1)

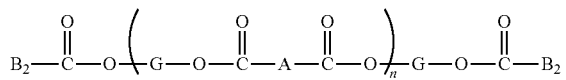

(2)

(wherein $B_1$ represents a monoalcohol residue, $B_2$ represents a monocarboxylic acid residue, A represents an aromatic dicarboxylic acid residue, G represents an aliphatic diol residue, m and n each are the number of the repeating units enclosed in the parentheses and are 1 or more, and A's may be the same or different and G's may be the same or different for the different repeating units enclosed in the parentheses).

The letter m in the general formula (1) and n in the general formula (2) each are the number of the repeating units enclosed in the parentheses and are 1 or more. m and n each may be any value as long as the polyester resin represented by the general formula (1) or the general formula (2) has a melting point of 100 to 250° C. and each are, for example, 1 to 50 depending on the molecular weights of the $B_1$, G, A, and $B_2$.

The polyester resin represented by the general formula (1) as an example of the dispersant for calcium carbonate of the present invention can be produced, for example, by the following methods.

Method 1: a dicarboxylic acid, a diol, and a monoalcohol that provide the respective residues in the polyester resin represented by the general formula (1) are put all together and reacted.

Method 2: a dicarboxylic acid and a diol that provide the respective residues in the polyester resin represented by the general formula (1) are reacted under such a condition that the equivalent of the carboxyl group is larger than the equivalent of the hydroxy group to produce a polyester resin having a carboxyl group at each terminal of the main chain, and then the polyester resin is reacted with a monoalcohol that provides $B_1$.

The polyester resin represented by the general formula (2) can be produced, for example, by the following methods.

Method 3: an aromatic dicarboxylic acid, an aliphatic diol, and a monocarboxylic acid that provide the respective residues in the polyester resin represented by the general formula (2) are put all together and are reacted.

Method 4: an aromatic dicarboxylic acid and an aliphatic diol that provide the respective residues in the polyester resin represented by the general formula (2) are reacted under such a condition that the equivalent of the hydroxy group is larger than the equivalent of the carboxyl group to produce a polyester resin having a hydroxy group at each terminal of the main chain, and then the polyester resin is reacted with a monocarboxylic acid that provides $B_2$.

Examples of the aromatic dicarboxylic acids include phthalic acid, terephthalic acid, isophthalic acid, dimethyl terephthalate, 2,6-naphthalenedicarboxylic acid, 1,5-naphthalenedicarboxylic acid, 1,4-naphthalenedicarboxylic acid, dimethyl 2,6-naphthalenedicarboxylate, dimethyl 1,5-naphthalenedicarboxylate, and dimethyl 1,4-naphthalenedicarboxylate.

Among the aromatic dicarboxylic acids, terephthalic acid, dimethyl terephthalate, isophthalic acid, dimethyl isophthalate, 2,6-naphthalenedicarboxylic acid, or dimethyl 2,6-naphthalenedicarboxylate is preferred since the resulting polyester resin has crystallinity and provides a dispersant for calcium carbonate that is excellent in handleability in mold-processing of the thermoplastic resin composition of the present invention.

Examples of the aliphatic diols for providing G include ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6- hexanediol, 2,2,4-trimethyl-1,3-pentanediol, 2-ethyl-1,3-hexanediol, 2-methyl-1,8-octanediol, 1,9-nonanediol, 1,10-decanediol, 1,12-dodecanediol, 2,2-bis(4-hydroxycyclohexyl)propane, and ether glycols, such as diethylene glycol and dipropylene glycol.

Among the aliphatic diols, an aliphatic diol having 2 to 10 carbon atom is preferred and ethylene glycol, 1,3-propylene glycol, 1,4-butanediol, or 1,6-hexanediol is more preferred since the resulting polyester resin has crystallinity and provides a dispersant for calcium carbonate that is excellent in handleability in mold-processing of the thermoplastic resin composition of the present invention and the melting point is easily adjusted within 100 to 250° C.

Examples of the monoalcohols include aromatic monoalcohols and aliphatic monoalcohols. Examples of the aromatic monoalcohols include phenol, ethylphenol, isobutylphenol, pentylphenol, octylphenol, dodecylphenol, tetradecylphenol, benzyl alcohol, 2-phenylethanol, 2-phenoxyethanol, and 3-phenyl-1-propanol.

Examples of the aliphatic monoalcohols include methanol, ethanol, propanol, isopropanol, butanol, heptanol, hexanol, cyclohexanol, isohexanol, octanol, isooctanol, 2-ethylhexanol, nonanol, isononanol, decanol, isodecanol, undecanol, dodecanol, stearyl alcohol, and oleyl alcohol.

Among the monoalcohols, an aliphatic monoalcohol is preferred, and an aliphatic monoalcohol having 4 to 22 carbon atoms is more preferred, and octanol, 2-ethylhexanol, nonanol, isononanol, decanol, or undecanol is further preferred, since the resulting dispersant for calcium carbonate has good compatibility to the thermoplastic resin (C) described later, particularly to polyolefin resins.

Examples of the monocarboxylic acids include aromatic monocarboxylic acids and aliphatic monocarboxylic acids. Examples of the aromatic monocarboxylic acids include benzoic acid, dimethylbenzoic acid, trimethylbenzoic acid, tetramethylbenzoic acid, ethylbenzoic acid, propylbenzoic acid, butylbenzoic acid, cuminic acid, p-t-butylbenzoic acid, o-toluic acid, m-toluic acid, p-toluic acid, ethoxybenzoic acid, propoxybenzoic acid, naphthoic acid, and anisic acid.

Examples of aliphatic monocarboxylic acids include acetic acid, propionic acid, butanoic acid, hexanoic acid, cyclohexanecarboxylic acid, 2-ethylhexanoic acid, myristic acid, palmitic acid, stearic acid, and behenic acid.

Among the monocarboxylic acids, an aliphatic monocarboxylic acid is preferred and an aliphatic monocarboxylic acid having 2 to 18 carbon atoms is more preferred since the resulting dispersant for calcium carbonate has good compatibility to the thermoplastic resin (C) described later, particularly to polyolefin resins. Note that in the present invention, the number of carbon atoms in the carboxylic acid includes the carbon atom in the carbonyl group.

The polyester resin represented by the general formula (1) or the general formula (2) can be produced, for example, by subjecting the raw materials as described above to an esterification reaction at a temperature within 180 to 250° C. for 10 to 25 hours, and as needed, in the presence of an esterification catalyst. Note that the conditions, such as temperature and time, of the esterification reaction are not limited and may be appropriately set.

Examples of the esterification catalysts include titanium-based catalysts, such as tetraisopropyl titanate and tetrabutyl titanate; a tin-based catalyst, such as dibutyltin oxide; and an organic sulfonic acid-based catalyst, such as p-toluenesulfonic acid.

The amount of the esterification catalyst used may be appropriately set, but is generally preferably within 0.001 to 0.1 parts by mass based on 100 parts by mass of the total amount of the raw materials.

Although the properties of the polyester resin represented by the general formula (1) or the general formula (2) are different depending on the factors, such as the number average molecular weight and the composition, the polyester resin is in a solid form having crystallinity.

The calcium carbonate composition of the present invention contains calcium carbonate (A) and the dispersant for calcium carbonate of the present invention [hereinafter sometimes abbreviated as the dispersant for calcium carbonate (B)], the dispersant for calcium carbonate (B) being contained in an amount of 0.05 to 5 parts by mass based on 100 parts by mass of the calcium carbonate (A).

Examples of the calcium carbonates (A) include a heavy calcium carbonate obtained by physically pulverizing natural white limestone and a synthesized calcium carbonate synthesized by a chemical precipitation reaction. The heavy calcium carbonate, which is produced by a production process of physically pulverizing natural limestone having high whiteness, has wide particle size distribution and has an irregular form inherent in physical pulverization.

Synthesized calcium carbonate is referred to as light calcium carbonate or settleable calcium carbonate, and is produced by a chemical precipitation reaction. As the production process, a $CO_2$ carbonation process in which carbon dioxide gas is blown in a calcium hydroxide slurry to precipitate calcium carbonate, a calcium chloride soda process through a reaction of calcium chloride and sodium carbonate, a water treatment process through a reaction of calcium hydrogen carbonate with calcium hydroxide, and the like are industrially employed.

Since the synthesized calcium carbonate is produced by a chemical precipitation reaction as described above, the shape and size of the particles can be controlled by adjusting production conditions, such as the calcium concentration in the raw materials, the temperature at the carbonation, and the reaction speed of the carbonation. Examples of well-known particle shapes include a spindle, cubic, columnar, and chained shape. The particles have relatively narrow size distribution and are relatively uniform in size.

For example, a spindle calcium carbonate generally has a spindle shape having a major axis of 1.5 to 6 μm and a miner axis of 0.3 to 2 μm, has a relatively high whiteness, and is superior in economy. In addition, a cubic calcium carbonate has a cubic shape having an average particle size of 0.02 to 0.3 μm.

The average particle size of the calcium carbonate to be used in the present invention is generally 0.01 to 3 μm, and preferably 0.01 to 1 μm.

Since the calcium carbonate composition of the present invention contains the dispersant for calcium carbonate (B) in an extremely small amount relative to the calcium carbonate (A), i.e., in an amount of 0.05 to 5 parts by mass based on 100 parts by mass of the calcium carbonate (A), the calcium carbonate composition has improved dispersibility in a thermoplastic resin. The content of the dispersant for calcium carbonate (B) in the calcium carbonate composition of the present invention is more preferably 0.1 to 3 parts by mass based on 100 parts by mass of the calcium carbonate (A) since such a composition has improved dispersibility in a thermoplastic resin in spite of a small content of the dispersant.

The calcium carbonate composition of the present invention can be produced by various processes and the production process is not limited. The calcium carbonate composition of the present invention can be produced, for example, by adding 0.05 to 5 parts by mass of the dispersant for calcium carbonate (B) to 100 parts by mass of the calcium carbonate (A), and then mixing the mixture with a ribbon blender, a high speed mixer, or the like.

The thermoplastic resin composition of the present invention contains the calcium carbonate (A), the dispersant for calcium carbonate (B), and a thermoplastic resin (C), the dispersant for calcium carbonate (B) being contained in an amount in the range of 0.05 to 5 parts by mass based on 100 parts by mass of the calcium carbonate (A).

Examples of the thermoplastic resins (C) include polyolefin resins, such as a polyethylene resin, a polypropylene resin, a polybutene resin, a polymethylpentene resin, an ethylene-vinyl acetate copolymer, and an ethylene-(meth) acrylic acid (ester) copolymer; polyester resins, such as a polyethylene terephthalate resin, a polybutylene terephthalate resin, a polyethylene naphthalate resin, a polyarylate resin, and polylactic acid; polycarbonate resins; polyamide resins, such as 6-nylon, 6,6-nylon, 6,10-nylon, and 12-nylon; and styrene resins, such as polystyrene, an AS resin, and an ABS resin.

Among the thermoplastic resins (C) used in the present invention, a polyolefin resin or a polyester resin is preferred and a polyethylene resin, a polypropylene resin, a polyethylene terephthalate resin, or polylactic acid is more preferred, and a polyethylene resin, a polyethylene terephthalate resin, or polylactic acid is further preferred, since the resulting thermoplastic resin composition has good dispersibility of the calcium carbonate (A).

In the thermoplastic resin composition of the present invention, since the dispersant for calcium carbonate (B) is used in an extremely small amount relative to the calcium carbonate (A), i.e., in an amount of 0.05 to 5 parts by mass based on 100 parts by mass of the calcium carbonate (A), the composition has improved dispersibility of calcium carbonate in a thermoplastic resin. The content of the dispersant for calcium carbonate (B) is more preferably 0.1 to 3 parts by mass based on 100 parts by mass of the calcium carbonate (A) since such a composition has improved dispersibility of calcium carbonate in a thermoplastic resin in spite of a small content of the dispersant.

The content of the calcium carbonate (A) in the thermoplastic resin composition of the present invention depends on the field of use of a molded body described later, and, for example, when the thermoplastic resin composition of the present invention is used to obtain a porous film, the content is 50 to 300 parts by mass, and preferably 100 to 200 parts by mass based on 100 parts by mass of the thermoplastic resin (C). In addition, when the thermoplastic resin composition of the present invention is used to obtain a reflector for LCD, the content is generally 20 to 120 parts by mass, and preferably 30 to 100 parts by mass based on 100 parts by mass of the thermoplastic resin (C).

The thermoplastic resin composition of the present invention can be produced by various processes and the production process is not limited. The thermoplastic resin composition of the present invention can be produced, for example, by mixing the calcium carbonate (A), the dispersant for calcium carbonate (B), and the thermoplastic resin (C) so that the content of the dispersant for calcium carbonate (B) is 0.05 to 5 parts by mass based on 100 parts by mass of the calcium carbonate (A), and kneading the mixture with a kneader, such as a Henschel mixer, a super mixer, a tumbler type mixer, a screw extruder, a biaxial screw extruder, a mixing roll, a Bunbury mixer, or a biaxial kneader. The kneaded product may be pelletized and used for production of the molded body of the present invention described later, or the kneaded product may be used to produce the molded body as it is without pelletization. In addition, the thermoplastic resin composition of the present invention may also be produced by mixing the calcium carbonate composition of the present invention with the thermoplastic resin (C).

The molded body of the present invention contains the thermoplastic resin composition of the present invention. It is possible that the thermoplastic resin composition of the present invention is produced by kneading as described above, followed by pelletization and the pellets are then used to produce the molded body of the present invention. It is also possible that the thermoplastic resin composition of the present invention is produced by kneading and the kneaded product is then used as it is to produce the molded body.

Examples of shapes of the molded body of the present invention include a film, fiber, tray, bottle, and pipe shape. Examples of the applications of the molded body include: various industrial parts and building parts, for example, automobile parts, parts of electrical and electronic products, such as a television and a vacuum cleaner, parts of housing equipment, such as a toilet seat; parts of automobile interior and exterior, such as an instrument panel, a glove box, a trim, a housing, a pillar, a bumper, a fender, and a back door; and an agricultural curing sheet, a raising seedling tray, a raising seedling pot, a growth pot, a plant pot, and a resin cap for corrosion and dust proof of a cast iron pipe for conduit. A film as an example of the molded body will be described in detail below.

A film as an example of the molded body of the present invention can be produced, for example, by melting and forming the thermoplastic resin composition of the present invention into a film at a temperature of the melting point of the contained thermoplastic resin (C) or higher, preferably the melting point+20° C. or higher and lower than the decomposition temperature thereof using a known molding machine, such as an extruder equipped with a T-die or the like or an inflation molding machine equipped with a circular die.

In addition, a porous film as an example of the film can be produced, for example, by stretching the film obtained by the above process as an original film in at least uniaxial direction. The porous film can be efficiently produced, for example, by the following process.

First, components to constitute the thermoplastic resin composition of the present invention are premixed with a Henschel mixer or a super mixer, and then kneaded and pelletized with a uniaxial or biaxial extruder. Next, the obtained pellet is molded with a molding machine into a film (an original film). As the molding machine, a T-die type or an inflation type one may be used and a T-die type molding machine is preferably used.

The obtained original film is uniaxially or biaxially stretched to cause interfacial separation between the thermoplastic resin (A) and the calcium carbonate (B) to form a porous structure. The stretch is performed using a roll method, a tenter method, or the like. A porous film is thus obtained. The original film is preferably stretched in at least uniaxial direction to 1.1 times or more, and preferably stretched to 1.5 to 5 times. In terms of the area stretching magnification, the original film is preferably stretched to 1.1 times or more, and preferably to 1.3 to 4 times.

The basis weight of the porous film may be, for example, 5 to 100 g/m$^2$, and the thickness may be, for example, 5 to 100 μm.

The porous film can be used as, for example, a hygiene material, a medical material, a clothing material, or the like. In addition, the porous film can be used as such a material in the form of a composite sheet with a fibrous sheet, such as nonwoven fabric, bonded on one surface thereof. In particular, since the porous film has moisture permeability as described above, when the porous sheet is used as it is or in the form of a composite sheet with a fibrous sheet bonded thereto as a material for forming an absorbable article, such as a disposal diaper, a sanitary napkin, a panty liner (discharge sheet), and an incontinence pad, the humidity rise in the wear can be prevented and a rash of the skin of the wearer can be effectively prevented. Such an absorbable article typically include a liquid permeable surface sheet, a liquid impermeable (including hardly permeable) back sheet, and a liquid retainable absorber disposed between the two sheets, and the porous film or the composite film of the porous film bonded to a fibrous sheet is preferably used particularly as the back sheet. In addition, the porous film or the composite film of the porous film bonded to a fibrous sheet can be used as a material of a component other than the back sheet, for example, as a material of standing gather, a waist barrier sheet, or the like, in an absorbable article taking advantage of the high softness and moisture permeability.

EXAMPLES

The present invention will be specifically described below with reference to examples. Unless otherwise specified, parts and % in the examples are by weight.

Example 1 (Dispersant for Calcium Carbonate)

Into a 1 L-four neck flask equipped with a thermometer, a stirrer, and a rectifying tube, 310 g of dimethyl terephthalate, 151 g of 1,4-butanediol, 83 g of 2-ethylhexanol, and 0.016 g of tetraisopropyl titanate as an esterification catalyst were put and the mixture was reacted for 15 hours in total while heating the mixture stepwise to 230° C. with stirring under nitrogen gas flow. After the reaction, excess 2-ethylhexanol was removed under reduced pressure to obtain a polyester resin represented by the general formula (1). The polyester resin was white solid at room temperature, had an acid value of 0.16 and a hydroxy group value of 5.8, and had an intrinsic viscosity IV value (phenol/tetrachloroethane=1/1 mixed solution, 30° C.) of 0.18 and a melting point of 209° C. The polyester resin had a number average molecular weight (Mn) of 2,200 and a weight average molecular weight (Mw) of 5,500. This is hereinafter abbreviated as a dispersant for calcium carbonate (1).

Example 2 (Same as Above)

Into a 1 L-four neck flask equipped with a thermometer, a stirrer, and a rectifying tube, 435 g of dimethyl terephthalate, 212 g of 1,4-butanediol, 58 g of 2-ethylhexanol, and 0.021 g of tetraisopropyl titanate as an esterification catalyst were put and the mixture was reacted for 15 hours in total while heating the mixture stepwise to 230° C. with stirring under nitrogen gas flow. After the reaction, excess 2-ethylhexanol was removed under reduced pressure to obtain a polyester resin represented by the general formula (1). The polyester resin was white solid at room temperature, had an acid value of 0.14 and a hydroxy group value of 6.1, and had an intrinsic viscosity IV value of 0.29 and a melting point of 216° C. The polyester resin had a number average molecular weight (Mn) of 3,800 and a weight average molecular weight (Mw) of 9,500. This is hereinafter abbreviated as a dispersant for calcium carbonate (2).

Example 3 (Same as Above)

Into a 1 L-four neck flask equipped with a thermometer, a stirrer, and a rectifying tube, 233 g of dimethyl terephthalate, 148 g of 1,6-hexanediol, 62 g of 2-ethylhexanol, and 0.010 g of tetraisopropyl titanate as an esterification catalyst were put and the mixture was reacted for 15 hours in total while heating the mixture stepwise to 230° C. with stirring under nitrogen gas flow. After the reaction, excess 2-ethylhexanol was removed under reduced pressure to obtain a polyester resin represented by the general formula (1). The polyester resin was white solid at room temperature, had an acid value of 0.15 and a hydroxy group value of 23.0, and had an intrinsic viscosity IV value of 0.17 and a melting point of 138° C. The polyester resin had a number average molecular weight (Mn) of 2,400 and a weight average molecular weight (Mw) of 5,500. This is hereinafter abbreviated as a dispersant for calcium carbonate (3).

Example 4 (Same as Above)

Into a 1 L-four neck flask equipped with a thermometer, a stirrer, and a rectifying tube, 390 g of dimethyl-2,6-naphthalate, 151 g of 1,4-butanediol, 83 g of 2-ethylhexanol, and 0.020 g of tetraisopropyl titanate as an esterification catalyst were put and the mixture was reacted for 15 hours in total while heating the mixture stepwise to 230° C. with stirring under nitrogen gas flow. After the reaction, excess 2-ethylhexanol was removed under reduced pressure to obtain a polyester resin represented by the general formula (1). The polyester resin was white solid at room temperature, had an acid value of 0.12 and a hydroxy group value of 3.8, and had an intrinsic viscosity IV value or 0.19 and a melting point of 230° C. The polyester resin had a number average molecular weight (Mn) of 2,200 and a weight average molecular weight (Mw) of 5,300. This is hereinafter abbreviated as a dispersant for calcium carbonate (4).

Example 5 (Same as Above)

Into a 1 L-four neck flask equipped with a thermometer, a stirrer, and a rectifying tube, 310 g of dimethyl terephthalate, 151 g of 1,4-butanediol, 92 g of isononylalcohol, and 0.016 g of tetraisopropyl titanate as an esterification catalyst were put and the mixture was reacted for 15 hours in total while heating the mixture stepwise to 230° C. with stirring under nitrogen gas flow. After the reaction, excess isononylalcohol was removed under reduced pressure to obtain a polyester resin represented by the general formula (1). The polyester resin was white solid at room temperature, had an acid value of 0.16 and a hydroxy group value of 5.5, and had an intrinsic viscosity IV value of 0.18 and a melting point of 205° C. The polyester resin had a number average molecular weight (Mn) of 2,100 and a weight average molecular weight (Mw) of 5,300. This is hereinafter abbreviated as a dispersant for calcium carbonate (5).

Example 6 (Same as Above)

Into a 1 L-four neck flask equipped with a thermometer, a stirrer, and a rectifying tube, 194 g of dimethyl terephthalate, 81 g of 1,4-butanediol, 97 g of 2-phenoxyethanol, and 0.018 g of tetraisopropyl titanate as an esterification catalyst were put and the mixture was reacted for 15 hours in total while heating the mixture stepwise to 230° C. with stirring under nitrogen gas flow. After the reaction, excess 2-phenoxyethanol was removed under reduced pressure to obtain a polyester resin represented by the general formula (1). The polyester resin was white solid at room temperature, had an acid value of 0.16 and a hydroxy group value of 5.5, and had an intrinsic viscosity IV value of 0.16 and a melting point of 215° C. The polyester resin had a number average molecular weight (Mn) of 1,500 and a weight average molecular weight (Mw) of 2,900. This is hereinafter abbreviated as a dispersant for calcium carbonate (6).

Comparative Example 1 (Dispersant for Calcium Carbonate for Comparison)

Into a 1 L-four neck flask equipped with a thermometer, a stirrer, and a rectifying tube, 94 g of adipic acid, 95 g of pentaerythritol, 358 g of oleic acid, and 0.028 g of tetraisopropyl titanate as an esterification catalyst were put and the mixture was reacted for 16 hours in total while heating the mixture stepwise to 230° C. with stirring under nitrogen gas flow. After the reaction, excess oleic acid was removed under reduced pressure to obtain a polyester resin. The polyester resin was light yellow liquid at room temperature, had an acid value of 0.23 and a hydroxy group value of 20.5, and had a viscosity at 25° C. of 7.5 Pa·s. This is hereinafter abbreviated as a dispersant for calcium carbonate (1').

Example 7 (Thermoplastic Resin Composition)

100 parts of a polyethylene resin (Umerit 2040F from Ube-Maruzen Polyethylene, melting point 116° C.), 100 parts of heavy calcium carbonate (specific surface area 4.5 to 5.0, particle size distribution 2.67), 0.6 parts of the dispersant for calcium carbonate (1), and a hindered phenol antioxidant (Irganox 1010 from BASF) as a stabilizer in an amount to be 1000 ppm based on the total mass of the polyethylene resin, the heavy calcium carbonate, and the dispersant for calcium carbonate (1) were mixed and stirred with a Henschel mixer to obtain a thermoplastic resin composition (1) of the present invention.

Extrusion was performed using the thermoplastic resin composition (1) while measuring the rise in the extrusion pressure in molding to thereby evaluate the dispersibility of calcium carbonate in the thermoplastic resin composition (1). The method of measuring the rise in the extrusion pressure is shown below. The evaluation result is shown in a table.

<Method of Measuring Rise in Extrusion Pressure>

The thermoplastic resin composition (1) was put in a kneader extruder (LABO PLASTOMILL from Toyo Seiki Seisakusho Ltd.) and was extruded into a strand at a kneading temperature of 220° C. to obtain a strand-shaped molded body. The extrusion pressure at the start of the extrusion and the extrusion pressure at 60 minutes after the start of the extrusion were measured and the variation (%) was determined from the following formula. The smaller the variation, the better the dispersibility of calcium carbonate. Note that three filters (pore size 250 μm, pore size 150 μm, and pore side 38 μm) were attached to the kneader extruder.

Variation (%)=[(pressure at 60 minutes after start of extrusion)−(pressure at start of extrusion)]×100/(pressure at start of extrusion)

In addition, the state of the strand-shaped molded body was evaluated according to the following criteria. The evaluation result is shown in the table.

A: no trace of shrinkage (sink mark) recognized in molded body and no roughness pattern observed on surface of molded body.

B: sink mark recognized in molded body or roughness observed on surface of molded body.

C: sink mark recognized in molded body and roughness observed on surface of molded body.

Example 8 (Same as Above)

A thermoplastic resin composition (2) of the present invention was obtained by the same operation as in Example 7 except for using the dispersant for calcium carbonate (2) instead of the dispersant for calcium carbonate (1). The same evaluation as in Example 7 was performed. The result is shown in the table.

Example 9 (Same as Above)

A thermoplastic resin composition (3) of the present invention was obtained by the same operation as in Example 7 except for using the dispersant for calcium carbonate (3) instead of the dispersant for calcium carbonate (1). The same evaluation as in Example 7 was performed. The result is shown in the table.

Example 10 (Same as Above)

A thermoplastic resin composition (4) of the present invention was obtained by the same operation as in Example 7 except for using the dispersant for calcium carbonate (4) instead of the dispersant for calcium carbonate (1). The same evaluation as in Example 7 was performed. The result is shown in the table.

Example 11 (Same as Above)

A thermoplastic resin composition (5) of the present invention was obtained by the same operation as in Example 7 except for using the dispersant for calcium carbonate (5) instead of the dispersant for calcium carbonate (1). The same evaluation as in Example 7 was performed. The result is shown in the table.

Example 12 (Same as Above)

A thermoplastic resin composition (6) of the present invention was obtained by the same operation as in Example 7 except for using the dispersant for calcium carbonate (6) instead of the dispersant for calcium carbonate (1). The same evaluation as in Example 7 was performed. The result is shown in the table.

Comparative Example 2 (Thermoplastic Resin Composition for Comparison)

A thermoplastic resin composition (1') for comparison was obtained in the same manner as in Example 7 except for not using the dispersant for calcium carbonate (1). The same evaluation as in Example 7 was evaluated. The result is shown in a table.

Comparative Example 3 (Same as Above)

A thermoplastic resin composition (2') for comparison was obtained in the same manner as in Example 7 except for using the dispersant for calcium carbonate (1') for comparison instead of the dispersant for calcium carbonate (1). The same evaluation as in Example 7 was evaluated. The result is shown in the table.

Example 13 (Thermoplastic Resin Composition)

A thermoplastic resin composition (7) was obtained in the same manner as in Example 7 except for using light calcium carbonate (specific surface area 4.8, particle size distribution 1.10) instead of the heavy calcium carbonate. The same evaluation as in Example 7 was evaluated. The result is shown in the table.

Comparative Example 4 (Thermoplastic Resin Composition for Comparison)

A thermoplastic resin composition (3') for comparison was obtained in the same manner as in Example 13 except for not using the dispersant for calcium carbonate (1). The same evaluation as in Example 7 was evaluated. The result is shown in the table.

Example 14 (Thermoplastic Resin Composition)

100 parts of a polyethylene terephthalate resin (BF3068 from Indorama Ventures, melting point 254° C.), 30 parts of heavy calcium carbonate (specific surface area 6.0 to 7.0, particle size distribution 1.39), and 0.2 parts of the dispersant for calcium carbonate (1) were mixed and stirred with a Henschel mixer to obtain a thermoplastic resin composition (8) of the present invention. The same evaluation as in Example 7 was performed except that the kneading temperature was changed to 260° C. The result is shown in a table.

Comparative Example 5 (Thermoplastic Resin Composition for Comparison)

A thermoplastic resin composition (4') for comparison was obtained in the same manner as in Example 14 except for not using the dispersant for calcium carbonate (1). The same evaluation as in Example 7 was performed except that the kneading temperature was changed to 260° C. The result is shown in the table.

Example 15 (Thermoplastic Resin Composition)

100 parts of a polylactic acid resin (TERRAMAC TP-4000 from Unitika Ltd., melting point 170° C.), 30 parts of heavy calcium carbonate (specific surface area 4.5 to 5.0, particle size distribution 2.67), and 0.2 parts of the dispersant for calcium carbonate (1) were mixed and stirred with a Henschel mixer to obtain a thermoplastic resin composition (9) of the present invention. The same evaluation as in Example 7 was performed except that the kneading temperature was changed to 190° C. The result is shown in the table.

Comparative Example 6 (Thermoplastic Resin Composition for Comparison)

A thermoplastic resin composition (5') for comparison was obtained in the same manner as in Example 15 except for not using the dispersant for calcium carbonate (1). The same evaluation as in Example 7 was performed except that the kneading temperature was changed to 190° C. The result is shown in the table.

TABLE 1

|  | Example 7 | Example 8 | Example 9 | Example 10 | Example 11 | Example 12 |
|---|---|---|---|---|---|---|
| Thermoplastic resin composition | (1) | (2) | (3) | (4) | (5) | (6) |
| Calcium carbonate (A) | (1) | (1) | (1) | (1) | (1) | (1) |
| Dispersant for calcium carbonate (B) | (1) | (2) | (3) | (4) | (5) | (6) |
| Thermoplastic resin (C) | PE | PE | PE | PE | PE | PE |
| Molding pressure at start of extrusion (MPa) | 5.5 | 6.2 | 5.2 | 5.8 | 5.2 | 5.0 |
| Molding pressure after 60 minutes extrusion (MPa) | 6 | 6.8 | 6 | 6.6 | 5.5 | 5.6 |
| Variation in pressure (%) | 9 | 10 | 15 | 14 | 5 | 12 |
| Appearance of molded article | A | A | A | A | A | A |

TABLE 2

|  | Comparative Example 2 | Comparative Example 3 | Example 13 | Comparative Example 4 |
|---|---|---|---|---|
| Thermoplastic resin composition | (1') | (2') | (7) | (3') |
| Calcium carbonate (A) | (1) | (1) | (2) | (2) |
| Dispersant for calcium carbonate (B) | None | (1') | (1) | None |
| Thermoplastic resin (C) | PE | PE | PE | PE |
| Molding pressure at start of extrusion (MPa) | 3.6 | 3.5 | 4.5 | 4.8 |

TABLE 2-continued

|  | Comparative Example 2 | Comparative Example 3 | Example 13 | Comparative Example 4 |
|---|---|---|---|---|
| Molding pressure after 60 minutes extrusion (MPa) | 5.5 | 5.2 | 4.5 | 5.8 |
| Variation in pressure (%) | 53 | 49 | 0 | 21 |
| Appearance of molded article | C | C | A | B |

TABLE 3

|  | Example 14 | Comparative Example 5 | Example 15 | Comparative Example 6 |
|---|---|---|---|---|
| Thermoplastic resin composition | (8) | (4') | (9) | (5') |
| Calcium carbonate (A) | (3) | (3) | (1) | (1) |
| Dispersant for calcium carbonate (B) | (1) | None | (1) | None |
| Thermoplastic resin (C) | PET | PET | PLA | PLA |
| Molding pressure at start of extrusion (MPa) | 0.3 | 0.5 | 0.3 | 0.4 |
| Molding pressure after 60 minutes extrusion (MPa) | 0.5 | 1.5 | 0.4 | 0.7 |
| Variation in pressure (%) | 67 | 200 | 33 | 75 |
| Appearance of molded article | A | B | A | A |

Notes for Tables 1 to 3

Calcium carbonate (1): heavy calcium carbonate (specific surface area 4.5 to 5.0, particle size distribution 2.67

Calcium carbonate (2): light calcium carbonate (specific surface area 4.8, particle size distribution 1.10)

Calcium carbonate (3): heavy calcium carbonate (specific surface area 6.0 to 7.0, particle size distribution 1.39

PE: polyethylene resin Umerit 2040F

PET: polyethylene terephthalate resin BF3068

PLA: polylactic acid resin TERRAMAC TP-4000

The invention claimed is:

1. A dispersant for calcium carbonate, comprising a polyester resin containing an aromatic dicarboxylic acid residue, an aliphatic diol residue, and a monoalcohol residue or a monocarboxylic acid residue and having a melting point of 100 to 230° C.;
   wherein the aliphatic diol residue is a 1,3-propylene glycol residue, a 1,4-butanediol residue, or a 1,6-hexanediol residue; and
   wherein the aliphatic monoalcohol residue is an octanol residue, a 2-ethylhexanol residue, a nonanol residue, an isononanol residue, a decanol residue, or an undecanol residue.

2. The dispersant for calcium carbonate according to claim 1, which is represented by the general formula (1) or the general formula (2):

[Chem. 1]

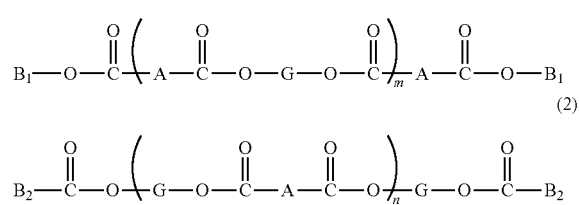

wherein, $B_1$ represents a monoalcohol residue, $B_2$ represents a monocarboxylic acid residue, A represents an aromatic dicarboxylic acid residue, G represents an aliphatic diol residue, m and n each represent a number of repeating units enclosed in the parentheses and are 1 or more, and A's may be the same or different and G's may be the same or different for the different repeating units enclosed in the parentheses.

3. The dispersant for calcium carbonate according to claim 1, wherein the melting point is 130 to 230° C.

4. The dispersant for calcium carbonate according to claim 1, wherein the aromatic dicarboxylic acid residue is a terephthalic acid residue, an isophthalic acid residue, or a 2,6-naphthalenedicarboxylic acid residue.

5. The dispersant for calcium carbonate according to claim 1, wherein the monocarboxylic acid residue is an aliphatic monocarboxylic acid residue having 1 to 17 carbon atoms.

6. A calcium carbonate composition comprising calcium carbonate (A) and a dispersant for calcium carbonate (B), the dispersant for calcium carbonate (B) being contained in an amount of 0.05 to 5 parts by mass based on 100 parts by mass of the calcium carbonate (A);
   wherein the dispersant for calcium carbonate (B) comprises a polyester resin containing an aromatic dicarboxylic acid residue, an aliphatic diol residue, and a monoalcohol residue or a monocarboxylic acid residue and having a melting point of 100 to 230° C.,
   wherein the aliphatic diol residue is a 1,3-propylene glycol residue, a 1,4-butanediol residue, or a 1,6-hexanediol residue, and
   wherein the aliphatic monoalcohol residue is an octanol residue, a 2-ethylhexanol residue, a nonanol residue, an isononanol residue, a decanol residue, or an undecanol residue.

7. The calcium carbonate composition according to claim 6, wherein the dispersant for calcium carbonate (B) is contained in an amount of 0.1 to 3 parts by mass based on 100 parts by mass of the calcium carbonate (A).

8. A thermoplastic resin composition comprising calcium carbonate (A), a dispersant for calcium carbonate (B), and a thermoplastic resin (C), the dispersant for calcium carbonate (B) being contained in an amount of 0.05 to 5 parts by mass based on 100 parts by mass of the calcium carbonate (A);
wherein the dispersant for calcium carbonate (B) comprises a polyester resin containing an aromatic dicarboxylic acid residue, an aliphatic diol residue, and a monoalcohol residue or a monocarboxylic acid residue and having a melting point of 100 to 230° C.,
wherein the aliphatic diol residue is a 1,3-propylene glycol residue, a 1,4-butanediol residue, or a 1,6-hexanediol residue, and
wherein the aliphatic monoalcohol residue is an octanol residue, a 2-ethylhexanol residue, a nonanol residue, an isononanol residue, a decanol residue, or an undecanol residue.

9. The thermoplastic resin composition according to claim 8, wherein the dispersant for calcium carbonate (B) is contained in an amount of 0.1 to 3 parts by mass based on 100 parts by mass of the calcium carbonate (A).

10. The thermoplastic resin composition according to claim 8, wherein the thermoplastic resin (C) is a polyolefin resin or a polyester resin.

11. The thermoplastic resin composition according to claim 8, wherein the thermoplastic resin (C) is a polyethylene resin, a polyethylene terephthalate resin, or polylactic acid.

12. A molded body comprising the thermoplastic resin composition according to claim 8.

* * * * *